United States Patent [19]

Stokes, Jr. et al.

[11] 3,769,007

[45] Oct. 30, 1973

[54] LEAD-BISMUTH ALLOY FOR SOLDERING ALUMINUM

[75] Inventors: John J. Stokes, Jr.; Robert A. Cargnel; Robert C. Geiger, all of Murrysville, Pa.

[73] Assignee: Aluminum Company of America, Pittsburgh, Pa.

[22] Filed: Apr. 13, 1972

[21] Appl. No.: 243,853

Related U.S. Application Data

[60] Continuation-in-part of Ser. No. 200,855, Nov. 22, 1971, abandoned, which is a division of Ser. No. 71,281, Sept. 10, 1970, abandoned.

[52] U.S. Cl. ........... 75/166 B, 75/134 D, 75/134 T, 75/166 C
[51] Int. Cl. ............................................. C22c 11/00
[58] Field of Search ...................... 75/166 B, 166 C, 75/134 D, 134 T

[56] References Cited
UNITED STATES PATENTS

| | | | |
|---|---|---|---|
| 2,335,615 | 11/1943 | Strasser | 75/134 D |
| 2,351,477 | 6/1944 | Bouton et al. | 75/166 C |
| 2,615,074 | 10/1952 | Bronovicki | 75/166 C |
| 2,787,346 | 4/1957 | Goeckel | 75/166 C X |
| 3,449,818 | 6/1969 | Lowe et al. | 75/134 D X |
| 3,600,164 | 8/1971 | Harvey | 75/166 C |

FOREIGN PATENTS OR APPLICATIONS

| | | | |
|---|---|---|---|
| 607,661 | 7/1926 | France | 75/166 C |
| 727,651 | 10/1942 | Germany | 75/166 B |

*Primary Examiner*—L. Dewayne Rutledge
*Assistant Examiner*—E. L. Weise
*Attorney*—Carl R. Lippert

[57] ABSTRACT

An improved soldering alloy especially suitable for soldered joints comprising one or more aluminum members has a base containing lead and bismuth to which is added a small amount of silver or indium. The solder alloy has a low melting point of typically less than 480°F together with very good corrosion resistance. The alloy can also contain relatively small amounts of tin, zinc and antimony.

18 Claims, No Drawings

LEAD-BISMUTH ALLOY FOR SOLDERING ALUMINUM

RELATED APPLICATION

This is a continuation in part of U. S. Ser. No. 200,855, filed Nov. 22, 1971 now abandoned, which, in turn was divided from U. S. Ser. No. 71,281, filed Sept. 10, 1970 now abandoned.

BACKGROUND

There are various soldering alloys suitable for joining aluminum members among which are the so-called low melting varieties which melt below 500°F. These solders are especially useful in the electrical and electronics industry in joining an aluminum wire, cable, or the like, to another member which may or may not be aluminum. The low melting solders are so desirable here because of the use of plastics as insulation or as printed circuit boards. Since the plastics melt at relatively low temperatures, the use of generally superior but higher melting solders is unattractive which prompts the move to lower melting solders. An example of such a solder contains 50 percent lead and 50 percent tin. This solder is completely liquid at approximately 420°F and has good wettability of aluminum and other surfaces commonly joined in electrical connections and accordingly provides sound joints. However, this solder along with other types of low melting solder alloys exhibit a weakness with respect to corrosion resistance in that the joints often deteriorate especially under more stringent conditions such as high humidity. In tests where the joints are immersed in 3 percent sodium chloride aqueous solution most fail in less than 100 hours. The failure occurs along the interface between the aluminum member and the solder filler and results in a loss of contact.

With reference to joining aluminum, soldering does not involve melting the aluminum parent member as is the case in welding and the filler metal is not an aluminum base alloy as is the case in brazing where there is substantial diffusion between the parent and filler metals. In soldering there is no mixing or diffusion between filler and parent members but rather a clearly defined interfacial layer therebetween which is easily observed in photomicrographs of joined cross sections. It is this interfacial layer which is susceptible to corrosion in prior low melting solder alloys used in joining aluminum members.

DESCRIPTION

The improved solder alloy substantially eliminates the interfacial corrosion failures which characterized prior low melting solders used in joining aluminum. The improved alloy consists essentially of by weight 45 to 90 percent lead, 50 to 8 percent bismuth, the lead and bismuth constituting at least 80 percent of the solder alloy composition, along with at least one element selected from the group consisting of 0.5 to 5 percent silver and 0.5 to 10 percent indium. Concerning lead, a preferred minimum is 55 percent and a preferred maximum is 83 percent although the preferred maximum can reach to 85 percent lead but with some increase in melting point. Concerning bismuth, a preferred minimum is 11 percent and a preferred maximum is 40 percent. In addition to the foregoing the improved solder may contain additional additives of up to 10 percent tin, up to 2 percent zinc and up to 1.5 percent antimony. It is believed that tin contributes to the corrosion which characterized the previous low melting solder alloys. However, the improved alloy can contain from 0.5 to 10 percent tin which improves the wetting characteristics of the soldering alloy and still retain very good corrosion resistance, although it is preferred to limit the tin content to less than 5 percent, for instance 4.5 percent or less to assure good corrosion resistance under most conditions. Tin additions of 0.5 to 4.5 percent are useful to improve wetting while retaining good corrosion resistance. Nonetheless where corrosion resistance is of paramount importance the alloy should contain little or no tin, that is less than 0.5 percent tin. Zinc can be employed in amounts of 0.1 to 2 percent to improve the strength of the soldering alloy; for instance, adding 1.5 percent zinc can improve the strength by about 20 percent. Antimony may be included in amounts of about 0.1 to 1.5 percent in order to further improve corrosion resistance especially in high humidity conditions although at some small sacrifice in wetting characteristics. One preferred composition contains 55 to 65 percent lead, 20 to 30 percent bismuth, 5 to 10 percent tin and silver or indium preferably in amounts of 0.5 to 2 percent silver or 0.75 to 3 percent indium. This preferred embodiment exhibits extremely good wetting and soldering characteristics together with very good resistance to corrosion. Another preferred composition contains 73 to 83 percent lead, 14 to 22 percent bismuth and 1.5 to 4 percent silver. This alloy exhibits outstanding resistance to corrosion effects in soldered joints especially in joints of aluminum to itself or to copper although at some sacrifice in wetting characteristics. To either of the preferred compositions just mentioned may be added a small amount of zinc to improve strength and a small amount of antimony to further improve corrosion resistance but at a small sacrifice in wetting characteristics.

The improved solder typically melts at temperatures varying from around 335°F to around 465°F, although some compositions melt at temperatures as low as 225°F or as high as levels approaching 600°F, such that the heating means normally employed in low temperature soldering can be utilized. These means include torch or flame soldering, employing a mild flame to avoid melting the aluminum member, soldering irons, furnace soldering, dip soldering, wipe soldering, ultrasonic soldering and other commonly used solder techniques. In most soldering operations used in joining aluminum, a reactive chemical flux is normally required. The flux prevents formation of oxide films during heating and can remove surface films although pre-cleaning is the more reliable way to remove the surface films. As a result the flux promotes the creation of a sound joint by permitting the molten solder filler metal to wet and intimately contact the parent members being joined. Typical fluxes suitable in joining members using the improved solder filler alloy include the known chloride-containing fluxes and chloride-free organic fluxes although the latter may be preferred. The improved solder filler alloy can also be employed in the fluxless soldering techniques such as ultrasonic or the so-called "rub" soldering. In these techniques the oxide film is mechanically disturbed by physically rubbing or by molten bath agitation.

In soldering according to the improved method, the members are simply brought into joining relationship by which is meant such proximity and alignment as to permit connection by capillary and other actions inherently involved in soldering whereby the molten solder filler alloy wets and forms a connecting bridge between the parent members. In joining two wires this can be substantially face-to-face contact as by the well known twisted connection. In joining a tube to a sheet or fin the tube can be laid upon the sheet. An electrical connection can constitute a wire or cable and a more or less close fitting connection lug or socket-like receptacle or connector. After the members are brought into joining relationship the improved filler alloy is provided or disposed at the joint site and the site heated to a temperature which melts the filler alloy but not the parent members. As indicated above a flux is commonly, but not necessarily employed to aid wetting by the filler metal. Typical temperatures are from a few degrees to 100°F above the melting point of the solder filler alloy. After the filler alloy wets the parent members and forms a connecting bridge therebetween, the alloy is solidified.

The improved solder may be employed to join aluminum to aluminum or to other metals such as copper. The joints exhibit strength and electrical properties similar to joints made with previous solder alloys but much better corrosion resistance.

To further illustrate the invention and the advantages thereof the following examples proceed.

Aluminum alloy EC (electrical conductor alloy containing at least 99.6 percent aluminum) wire No. 18 gauge was soldered to substantially pure aluminum foil about 0.003 inches in thickness, employing solder filler alloys having the compositions listed below:

A 50% Pb – 50% Sn

B 91% Sn – 9% Zn

These are considered good commercial soldering alloys for aluminum joints. Several joints were made with each alloy using a torch or in some instances a soldering iron and an organic chloride-free type flux. The joints were mechanically and electrically sound but after immersion in an aqueous solution containing 3 percent sodium chloride, all the joints failed in less than 100 hours. In all the failures the solder filler separated from either the aluminum foil or the wire as a result of interfacial corrosion, that is corrosion at the interface between the solder filler alloy and the aluminum parent member.

In another test like wire was joined to like foil using the improved solder filler (alloy C) containing 78.5% Pb, 18.5% Bi and 3% Ag. This joint remained intact after more than 1,000 hours immersion in the sodium chloride solution accelerated corrosion test. Eventually a failure did occur but as the result of sacrificial corrosion of the aluminum foil and not by interfacial corrosion.

In further tests of the improved solder filler alloy joints of the type described above were made using the improved solder compositions set forth in the table below.

|   | Pb | Bi | Sn | In | Ag | Sb |
|---|---|---|---|---|---|---|
| D | 68.4 | 17.2 | 4.8 | 4.8 | 2.9 | 1.9 |
| E | 70 | 10.6 | 9.8 | 4.8 | 2.9 | 1.9 |

In the same corrosion test as described above the joint made with alloy D failed after 960 hours and the joint made with alloy E failed after 780 hours. Again, however, the failures occurred as the result of sacrificial corrosion of the aluminum foil parent member and not by interfacial corrosion.

In another series of tests No. 18 gauge copper wire was joined to aluminum foil 0.003 inches thick. The aluminum to copper solder joint is considered much more critical from the standpoint of corrosion than an all aluminum solder joint. The solder compositions tested were those described above and the hours to failure are set forth in the table below.

| Alloy | Hours to Failure |
|---|---|
| A | 24 |
| B | 24 |
| C | 850 |
| D | 760 |
| E | 810 |

The failures in the case of the prior art solder filler alloys, A and B, both occurred as the result of interfacial corrosion, that is, the foil separated intact from the solder filler alloy. The failures with the improved alloys, C, D and E all occurred as a result of sacrificial corrosion of the foil. That is the interface between the foil and the solder filler alloy remained undisturbed and the foil in the regions adjacent to the solder filler in the plane of the foil failed by corrosion. From the above examples it is clear that the improved solder filler alloy and the interface between it and parent members survive the members themselves in corrosion tests and this is an extremely significant and highly unique characteristic for low melting solder alloys useful in joining aluminum parent members.

What is claimed is:

1. An alloy consisting essentially of, by weight, 45 to 90 percent lead, 8 to 50 percent bismuth, the lead and bismuth totalling at least 80 percent, and at least one element selected from the group consisting of 0.5 to 5 percent silver and 0.5 to 10 percent indium.

2. The alloy according to claim 1 which additionally contains up to 10 percent tin, up to 2 percent zinc and up to 1.5 percent antimony.

3. The alloy according to claim 1 which contains less than 5 percent tin.

4. The alloy according to claim 1 which contains less than 0.5 percent tin.

5. The alloy according to claim 1 which contains 0.5 to 4.5 percent tin.

6. The alloy according to claim 1 which contains 0.1 to 2 percent zinc.

7. The alloy according to claim 1 which also contains 0.1 to 1.5 percent antimony.

8. The alloy according to claim 1 which contains at least 55 percent lead.

9. The alloy according to claim 1 which contains 55 to 83 percent lead.

10. The alloy according to claim 1 which contains at least 11 percent bismuth.

11. An alloy consisting essentially of 55 to 85 percent lead, 11 to 40 percent bismuth, the lead and bismuth totalling at least 80 percent, and at least one element selected from the group consisting of 0.5 to 5 percent silver and 0.5 to 10 percent indium.

12. The alloy according to claim 11 which contains tin but in an amount less than 5 percent tin.

13. The alloy according to claim 11 which contains less than 0.5 percent tin.

14. The alloy according to claim 2 which contains 55 to 65 percent lead, 20 to 30 percent bismuth and 5 to 10 percent tin.

15. The alloy according to claim 11 which consists essentially of 73 to 83 percent lead, 14 to 22 percent bismuth and 1.5 to 4 percent silver.

16. The alloy according to claim 14 wherein said silver range is 0.5 to 2 percent and said indium range is 0.75 to 3 percent.

17. The alloy according to claim 15 which contains less than 0.5 percent tin.

18. The alloy according to claim 15 which contains 0.5 to 4.5 percent tin.

* * * * *